G. T. HARVEY.
REPAIR PLUG FOR PIPES.
APPLICATION FILED JULY 18, 1919.

1,340,167.

Patented May 18, 1920.

Inventor
GEORGE T. HARVEY
By
Attorneys

UNITED STATES PATENT OFFICE.

GEORGE T. HARVEY, OF HALSTEAD, KANSAS.

REPAIR-PLUG FOR PIPES.

1,340,167.  Specification of Letters Patent.  Patented May 18, 1920.

Application filed July 18, 1919. Serial No. 311,698.

*To all whom it may concern:*

Be it known that I, GEORGE T. HARVEY, a citizen of the United States, residing at Halstead, in the county of Harvey, State of Kansas, have invented certain new and useful Improvements in Repair-Plugs for Pipes; and I do hereby declare the following to be a full, clear, and exact description of the invention, such as will enable others skilled in the art to which it appertains to make and use the same.

This invention relates to new and useful improvements in repair devices for water or gas pipes.

One object of the present invention is to provide a novel and improved plug for closing or stopping up leaks in fluid or gas pipes.

Another object of the invention is to provide a novel and improved plug which may be easily and quickly inserted in the opening in the pipe and which will effectively close the opening so that no gas or fluid will escape therethrough.

A further object of the invention is to provide a novel and improved device which consists of few and simple parts, rendering the manufacture cheap, and will be easy and effective in its operation.

Other objects and advantages will be apparent from the following description when taken in connection with the accompanying drawing.

Figure 1:
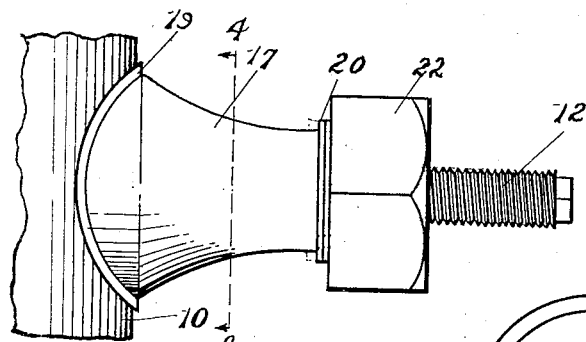
Figure 1 is an elevation of the invention applied to a pipe.
Figure 4:
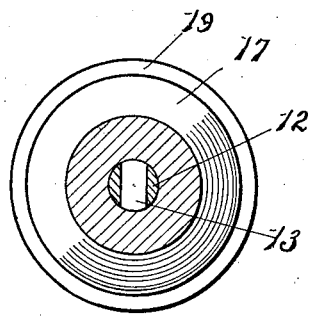
Fig. 4 is a transverse sectional view taken on the line 4—4 of Fig. 1, looking in the direction of the arrows.
Figure 2:
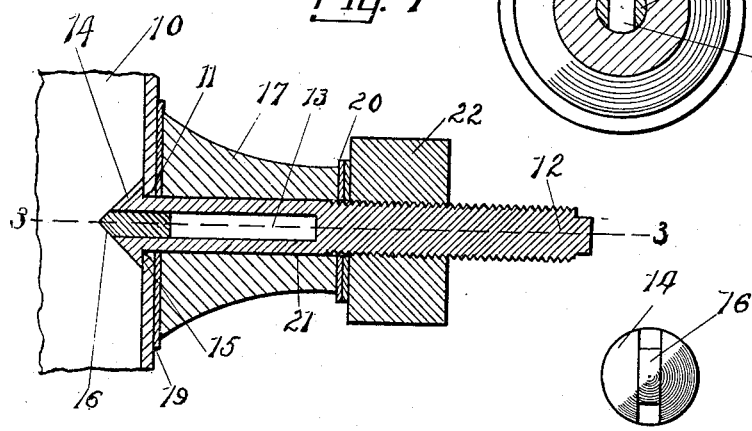
Fig. 2 is a sectional view through the pipe and longitudinally through the invention.
Figure 5:
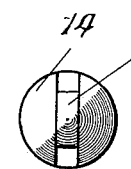
Fig. 5 is an end view of the plug as seen from within the pipe.
Figure 3:
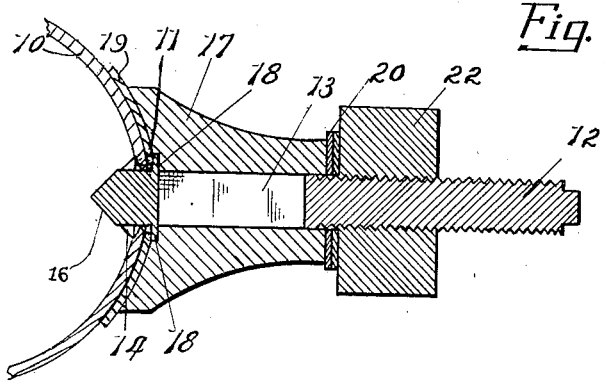
Fig. 3 is a longitudinal sectional view through the invention, and transversely through the pipe, taken in a plane at right angles to that of Fig. 2.

Referring particularly to the accompanying drawing, 10 represents a metal pipe, which has the opening 11 worn therethrough by rust or other form of deterioration, and in connection with which my invention is particularly adapted for use.

At 12 there is shown a bolt having one portion threaded, while the other portion is formed with a longitudinal kerf 13, extending through the end thereof. On the last-named end of the bolt, there are formed the heads 14 which result in the shoulders 15, the purpose of which will presently appear. Arranged to be placed within the said kerf is a wedge member 16. Engaged on the stem of the bolt is a tapering member 17 which has a recess 18 in the larger end for the reception of the inner end of the wedge member 16. Engaged on the stem of the bolt, and surrounding the recess, is a rubber washer 19, while a similar washer 20 is disposed on the smaller end of the member 17, and surrounding the adjacent end of the bore 21, through which the stem of the bolt is disposed. A nut 22 is engaged on the threaded portion of the stem of the bolt and bears against the rubber washer 20. The outer end of the threaded portion of the bolt is square in cross section for engagement by a wrench to hold the bolt against rotation while the nut is being turned. The members, or legs, at opposite sides of the kerf of the bolt are resilient and capable of being bent inwardly.

In the operation of the device, the wedge member 16 is placed in the inner portion of the kerf 13 and then the rubber washer 19, the member 17, the rubber washer 20, a metal washer 20′, and the nut, engaged on the bolt in the order named. The wedge member is thus disposed in such position in the kerf 13 that the outer portions of the legs of the bolt may be readily pressed inwardly toward each other, and the heads thus easily introduced through the opening 11 of the pipe 10. The nut is then turned toward the pipe with the result that the parts on the bolt will be forced toward the pipe. The wedge member will be moved toward the outer end of the kerf with the result that the legs will be forced apart against the wall of the pipe inwardly of the opening. At the same time the rubber washer 19 will be compressed against the outer face of the pipe and the washer 20 compressed against the smaller end face of the member 17, thus effectively preventing escape of water or gas from the opening 11, or up through the bore 21 of the member 17.

What is claimed is:

1. A repair device for a pipe consisting of an expansible and contractible stem, a wedge member removably disposed in the stem, and means on the stem for moving the wedge member to expand the stem.

2. A repair device for a pipe consisting of a longitudinally kerfed stem which is flexible at the sides of the kerf, a wedge member movable longitudinally in the kerf to produce a separation of the portions at the sides of the kerf, and means on the stem for moving the wedge member.

3. A repair device for a pipe consisting of a longitudinally kerfed stem having external threads at the unkerfed end, a wedge member removably disposed in the kerf and longitudinally slidable therein, a member disposed on the stem and having a recess for the reception of one end of the wedge member, packing members on opposite ends of the recessed member, and a clamping element threadedly engaged on the stem against the other end of the recessed member.

In testimony whereof, I affix my signature, in the presence of two witnesses.

GEO. T. HARVEY.

Witnesses:
 ERNEST N. HUEBERT,
 JOHN C. ELLIOTT.